United States Patent
Schaerfl et al.

[11] Patent Number: 6,142,188
[45] Date of Patent: Nov. 7, 2000

[54] CORRUGATED FLEXIBLE HOSE

[75] Inventors: William J. Schaerfl; Edward Romero, both of El Paso, Tex.

[73] Assignee: Dayco Products, Inc., Dayton, Ohio

[21] Appl. No.: 09/430,788

[22] Filed: Oct. 29, 1999

[51] Int. Cl.$^7$ ..................... F16L 11/11
[52] U.S. Cl. ................. 138/121; 138/DIG. 11
[58] Field of Search ............... 138/121, 122, 138/173, DIG. 11; 15/314, 315, 326

[56] References Cited

U.S. PATENT DOCUMENTS

| | | | |
|---|---|---|---|
| 3,313,319 | 4/1967 | Osborn et al. | 138/121 |
| 3,402,429 | 9/1968 | Davidson et al. | 18/19 |
| 3,559,692 | 2/1971 | Mantelet | 138/121 |
| 3,794,080 | 2/1974 | Huston et al. | 138/121 |
| 3,958,425 | 5/1976 | Maroschak | 138/121 X |
| 4,079,757 | 3/1978 | Fischer et al. | 138/121 |
| 4,151,864 | 5/1979 | Thurman | 138/121 X |
| 4,163,619 | 8/1979 | Fales | 405/49 |
| 4,296,157 | 10/1981 | Conti | 138/156 X |
| 4,790,975 | 12/1988 | Jarvenkyla et al. | 138/121 X |
| 4,877,224 | 10/1989 | Watts | 138/121 |
| 5,005,613 | 4/1991 | Stanley | 138/121 X |
| 5,193,588 | 3/1993 | Kanao | 138/121 X |
| 5,492,151 | 2/1996 | Wood et al. | 138/121 |
| 5,564,472 | 10/1996 | Gipperich | 138/121 |

*Primary Examiner*—Patrick Brinson
*Attorney, Agent, or Firm*—Joseph V. Tassone

[57] ABSTRACT

A corrugated non-reinforced polymeric flexible hose which has at least the outer crests formed with flat apices. The valleys of the corrugations may also have flat apices. The crests and valleys are connected by side walls extending at a shallow angle.

10 Claims, 1 Drawing Sheet

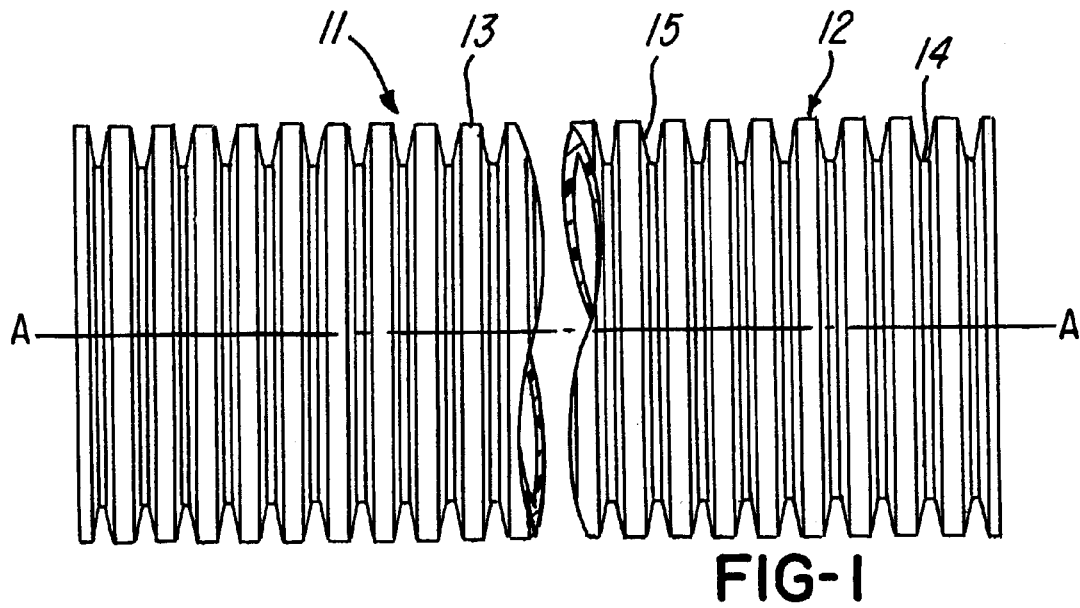
FIG-1
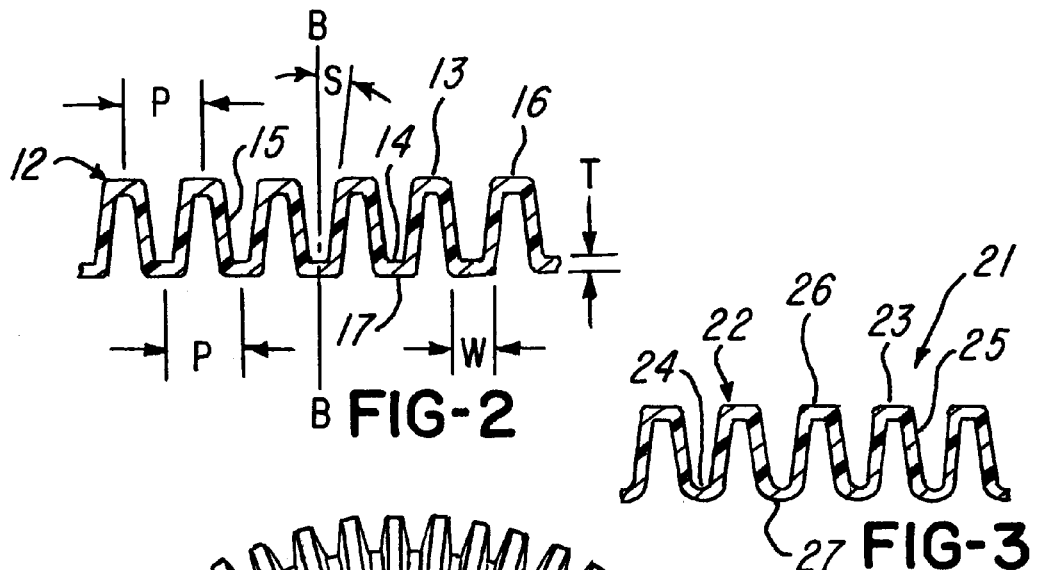
FIG-2
FIG-3
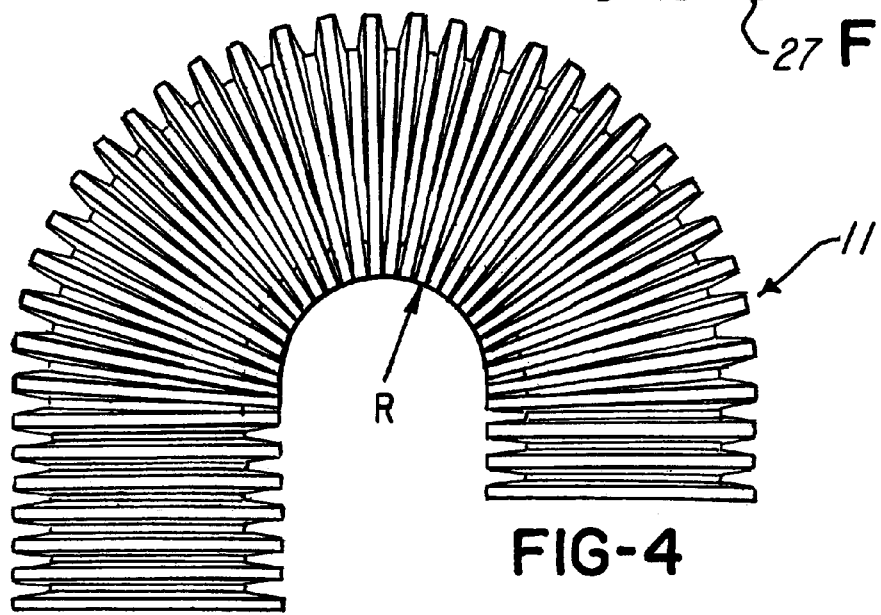
FIG-4

CORRUGATED FLEXIBLE HOSE

BACKGROUND OF THE INVENTION

1. Field of the Invention

This invention relates to a corrugated non-reinforced polymeric flexible hose, such as used in conjunction with vacuum cleaners and the like.

2. Prior Art Statement

Hoses of the type referred to above are known for use as vacuum cleaners, for example, and are made of various designs to accomplish specific purposes. See the following patents:

| Mantelet | 3,559,692 |
| Huston et al. | 3,794,080 |
| Fischer et al. | 4,079,757 |
| Wood et al. | 5,492,151 |

These hoses are made by processes well known in the art as shown, for example, in the following patents:

| Osborn et al. | 3,313,319 |
| Davidson et al. | 3,402,429 |
| Fales | 4,163,619 |

SUMMARY OF THE INVENTION

The novel hose of the present invention is designed with certain features that improve its flexibility, and at the same time makes it easily compressible and yet stretchable. This is accomplished by forming annular corrugations with alternating crests and valleys wherein either the crests alone, or both crests and valleys, are all formed with a flat apex. The pitch of the corrugations and the shallow angle of the side walls which interconnect the crests and valleys provide these desired features. The hose so produced has an unusual feel which is pleasing to the user, in the case of vacuum cleaner hose, this is usually the household engineer. The hose has a further feature of allowing a bend which will not distort or collapse the hose.

It is a principal object of this invention to provide a non-reinforced corrugated hose with superior characteristics.

It is a further object to provide such a hose that has excellent stretching and compressing characteristics as well as a pleasing feel.

It is another object to provide a hose that can be bent without collapse or distortion.

These and other objects will be apparent from the following description and drawings.

BRIEF DESCRIPTION OF THE DRAWINGS

FIG. 1 is a side view of a portion of the novel hose.

FIG. 2 is an enlarged sectional view of the hose, taken along line 2—2 of FIG. 1.

FIG. 3 is view similar to FIG. 2, illustrating a different hose design.

FIG. 4 is a view of the hose of FIG. 1 in a bent position.

DESCRIPTION OF PREFERRED EMBODIMENTS

Referring to FIG. 1, the portion of hose which is illustrated should be understood to include end portions, but these are omitted because they are not inventive features. Such ends are shown, for example, in the above-referenced patents to Davidson et al. and Huston et al. The hose may be made by blow molding or vacuum forming such as shown in the above-referenced patents to Osborn et al., Davidson et al., or Wood et al., which patents are hereby incorporated by reference in this application. The hose is made of a suitable polymeric material, such as ethylene vinyl acetate (EVA). The hose 11 has a longitudinal axis A—A and is formed of a series of annular corrugations 12, which comprise alternating crests 13 and valleys 14 that are interconnected by side walls 15 that extend at an angle to the crests and valleys.

As shown in detail in FIG. 2, the crests 13 all have flat apices 16, and the valleys 14 also all have similar flat apices 17. These apices have a width W of approximately 0.072 to 0.075 inch in a direction parallel to longitudinal axis A—A. The corrugations preferably have a pitch P of about 0.125 to 0.137 inch. The corrugations are of uniform thickness T of about 0.020 inch, including the side walls, the valleys, the peaks, and the apices. The side walls have a shallow angle S of 5 to 8 degrees with respect to a plane B—B which is transverse to the plane A—A. The hose may be made of any diameter which is desired for a specific purpose, but the most useful products have an outside diameter ranging from 1.1 to 2.65 inches. The hose made in accordance with the above description is very flexible and compressible. It is also capable of being easily stretched.

FIG. 3 illustrates the detailed construction of a hose 21 which is similar to hose 11 in having corrugations 22 with alternating crests 23 and valleys 24, interconnected by shallow angled side walls 25. The crests have flat apices 26, but the valleys 24 have apices 27 which are formed with a slight radius of about 0.015 inch. The hose 21 exhibits the same characteristics as the hose 11. The hose has a stretch ratio of approximately 1.75 to 1.00 from the natural condition thereof when subjected to a pull of 5 pounds in a longitudinal direction.

As shown in FIG. 4, the hose 11 exhibits a high degree of resistance to collapse and distort, and may be bent 180 degrees around an inside radius R of 2 inches. This is typical of hose 21 as well.

The specific embodiments described and illustrated are understood to be exemplary, and other embodiments fall within the scope of the invention.

What is claimed is:

1. In a hose having a longitudinal axis formed of polymeric material and having a plurality of annular corrugations, said corrugations comprising a plurality of alternating crests and valleys interconnected by side walls, each of said crests having a flat apex; the improvement wherein said side walls are at an angle of between 5 and 8 degrees with respect to a plane transverse to said longitudinal axis.

2. The hose of claim 1 wherein each of said valleys also has a flat apex.

3. The hose of claim 1 wherein said corrugations have a wall of uniform thickness.

4. In a hose having a longitudinal axis formed of polymeric material and having a plurality of annular corrugations, said corrugations comprising alternating crests and valleys interconnected by side walls each of said crests having a flat apex; the improvement wherein said side walls are at an angle of between 5 and 8 degrees with respect to a plane transverse to said longitudinal axis, and has a stretch ratio of approximately 1.75 to 1.00 from the natural condition thereof with an approximately 5 pound pull thereon in a longitudinal direction.

5. The hose of claim 1 wherein said polymeric material comprises an ethylene vinyl acetate copolymer.

6. The hose of claim 1 wherein said hose resists collapsing or distortion when bent 180 degrees at an inside radius of 2 inches.

7. The hose of claim 1 wherein said hose has an outside diameter ranging from 1.1 to 2.65 inches.

8. The hose of claim 1 wherein each apex has a width of approximately 0.072 to 0.075 inch in the direction parallel to said longitudinal axis.

9. The hose of claim 1 wherein said corrugations have a pitch of 0.125 to 0.137 inch.

10. The hose of claim 1 wherein said corrugations have a wall of uniform thickness, each apex has a width of approximately 0.072 to 0.075 inch in the direction parallel to said longitudinal axis, said corrugations have a pitch of 0.125 to 0.137 inch, said hose has a stretch ratio of 1.75 to 1.00 from the natural condition thereof with an approximately 5 pound pull thereon in a longitudinal direction, and said hose resists collapsing or distortion when bent 180 degrees at an inside radius of two inches.

* * * * *